(12) United States Patent
Reber et al.

(10) Patent No.: US 6,171,531 B1
(45) Date of Patent: Jan. 9, 2001

(54) METHOD FOR SIMULTANEOUS CONTROL OF MULTIPLE ACCUMULATORS

(75) Inventors: Dean H. Reber; James R. Utech, both of Cincinnati, OH (US)

(73) Assignee: Cincinnati Malacron Inc., Cincinnati, OH (US)

( * ) Notice: Under 35 U.S.C. 154(b), the term of this patent shall be extended for 0 days.

(21) Appl. No.: 09/242,832

(22) PCT Filed: Aug. 22, 1997

(86) PCT No.: PCT/US97/14895

§ 371 Date: Mar. 8, 1999

§ 102(e) Date: Mar. 8, 1999

(87) PCT Pub. No.: WO98/08665

PCT Pub. Date: Mar. 5, 1998

Related U.S. Application Data

(60) Provisional application No. 60/024,665, filed on Aug. 27, 1996.

(51) Int. Cl.$^7$ ...................................................... B29C 49/78
(52) U.S. Cl. ........................ 264/40.1; 264/40.7; 264/540; 425/145; 425/532
(58) Field of Search ................................. 264/40.1, 40.7, 264/540; 425/145, 532

(56) References Cited

U.S. PATENT DOCUMENTS

| | | | |
|---|---|---|---|
| 4,165,212 | 8/1979 | Ziegler | 425/382 |
| 5,223,191 | 6/1993 | Tatsuno et al. | 264/40.1 |

*Primary Examiner*—Leo B. Tentoni
(74) *Attorney, Agent, or Firm*—Stephen H. Friskney

(57) ABSTRACT

A method for cascade, closed loop control of multiple operating parameters for an extrusion blow molding machine having multiple accumulators is disclosed. The method provides closed loop control of the ram back pressure during refill, along with the closed loop adjustment of the pressure set points for "slave" accumulators based on a comparison of ram positions with that of a "master" accumulator. For systems that supply each accumulator with a separate extruder, the rotational speed of the extruder screw is the controlled operating parameter during refill. With respect to extrusion of the parisons, there is closed loop control of the ram velocity in conjunction with adjustment of the velocity set points for the slave accumulators based on a comparison of ram positions with that of the master accumulator.

9 Claims, 8 Drawing Sheets

METHOD FOR SIMULTANEOUS CONTROL OF MULTIPLE ACCUMULATORS

This application is a 371 of PCT/US97/14895, filed on Aug. 22, 1997, which claims the benefit of Provisional Application Ser. No. 60/024,665, filed on Aug. 27, 1996.

BACKGROUND OF THE INVENTION

1. Field of Invention

The present invention relates generally to extrusion blow molding machines having multiple accumulator heads and, more particularly, to a method for simultaneously controlling the rate at which the accumulator heads are filled with material and subsequently extrude a parison for the blow molding operation.

2. Description of the Related Art

In order to improve the production capacity of an extrusion blow molding machine, it is known in the art to use multiple accumulator heads to form multiple parisons for use in a particular blow molding application. The accumulators are typically supplied by a single extruder; although, in some cases, there may be a separate extruder for each accumulator. While the specific number of accumulators is determined by each application, the most common multiple accumulator machine configuration is the use of two accumulators supplied by one extruder in an extrusion blow molding machine.

In some situations, for example, the process involves extruding identical parisons from the two accumulators in order to form identical blow molded products. In other cases, there will be two different parts formed by the blow molding process, thus requiring extrusion of parisons that may be different in size, possibly diameter, wall thickness or overall length. In any case, in order to provide effective production operation, it is important that extrusion of the two parisons is completed simultaneously so that they are both ready for blow molding at the identical time. The timing is important so that the shape of one parison is not allowed to change (e.g., stretch) while waiting for the second accumulator to complete extrusion of the corresponding parison.

In an extrusion blow molding machine, the material supplied by the extruder occupies an internal space or chamber within the accumulator; the volume of the accumulator chamber is controlled by movement of a hydraulically operated ram or plunger. The ram moves downwardly to extrude a parison by forcing the material out of the chamber and through an annular die opening. The ram is forced upwardly during refill portion of the blow molding cycle as material is supplied by the extruder. Accordingly, it is also important that the accumulators be filled simultaneously so that they complete the filling process at the same time, even though they may ultimately contain different volumes of plastic material. The uniformity in filling helps assure consistency in material properties between the parisons, and enables the accumulators to begin extruding the parisons at the same point in time (without any delay), thereby reducing cycle time.

Without the capability for uniform timing of the multiple accumulator heads, it is virtually impossible to accomplish simultaneous movement of the accumulator rams over the same period even if their stroke is the same. The differences in the timing of the extrusion stroke or filling interval are attributable to a number of factors. For example, it is impractical to expect that the exact pressure conditions will apply to both accumulators, given the variations in the manufacture of the individual components that make up the accumulator assembly. In addition, there are other factors, such as the variance in temperatures, flow efficiencies and pressures of the hydraulic fluid that is used to move the ram in each accumulator head. Although the differences or variances by themselves may be relatively small, they combine to make it virtually impossible to assure precise coordination of timing of the ram movement between two accumulators, if they are independently controlled.

In order to accomplish more consistent timing with respect to extruding the parison and refilling multiple accumulator heads, prior art control systems for extrusion blow molding machines have attempted to compare the position and/or speed of the accumulator rams to coordinate the movement between the two accumulators (see FIG. 1). For example, U.S. Pat. No. 4,179,251 is specifically directed to this type of control over accumulator timing. In particular, the position of the ram of one accumulator would be compared to the position of the other ram during the extrusion of the parison or refilling of the accumulator chamber. If it was determined that one accumulator was filling (or extruding) faster than the other, the associated pressure valve would be adjusted to slow down the movement of the ram, thereby allowing the other accumulator to advance to a similar point in the process.

While this approach provides some improvement, its response capability is limited due to the delay inherent in accomplishing the steps involved in making the calculations and actuating the machine elements. Accordingly, the resulting adjustments to the movement of the ram are abrupt and can negatively effect the production quality of the blow molding process. In addition, the abrupt changes can result in abnormal wear on the hydraulic pressure control valves and the associated accumulator components. The preferred solution would provide for smooth, uniform filling in all accumulators, so that they reach their full shot position at exactly the same time, followed by simultaneous extrusion of the parisons so that the downward movement of all accumulator rams is completed at the same point in time.

SUMMARY OF THE INVENTION

It is an object of the present invention to provide a method by which the movements of the functional components of multiple accumulators in an extrusion blow molding machine can be coordinated to provide simultaneous filling of the accumulator chambers and subsequent extrusion of the parisons.

The present invention accomplishes this objective by providing a process for cascade, closed loop control of multiple operating parameters. More specifically, the process includes closed loop control of the ram back pressure during refill, along with the closed loop adjustment of the pressure set points for "slave" accumulators based on a comparison of ram positions with that of a "master" accumulator. Similarly, during extrusion of the parisons, there is closed loop control of the ram velocity, in conjunction with adjustment of the velocity set points for the slave accumulators based on a comparison of ram positions with that of the master accumulator.

One of the primary drawbacks associated with prior art control systems was the inability to respond quickly enough to enable smooth operation of the accumulators. In other words, the calculations connected with comparison of the "shot" of material, followed by an appropriate adjustment in the servovalve, did not change the relative positions of the accumulator quickly enough, requiring relatively large adjustments in the pressure in order to provide sufficient change in the movement of the ram. These large pressure changes resulted in the jerky or abrupt movement of the accumulator ram.

The present invention eliminates the shortcomings of the prior art by providing closed loop control of the back pressure on the accumulator ram during refill. Since the pressure is controlled with respect to a pressure set point (established by the operator), adjustments to overcome deviations from the set point are made very quickly and directly by means of a servovalve, since this control sequence does not have to wait for calculations connected to the comparison of ram position. However, this closed loop control of back pressure is combined with a control sequence that provides that provides simultaneous timing through a comparison of the accumulators' performance.

In describing the control system of the present invention, one accumulator is designated as a "master", i.e., its ram position or velocity is used as a reference for the other, "slave" accumulators. When differences are found upon comparison of the ram positions for the master and slave accumulators, the set point of each slave accumulator is adjusted accordingly. Thus, a new target (set point) pressure is established for each slave accumulator which will result in a change in rate of movement of the ram to bring it into agreement with the master accumulator. This manner of control involving separate adjustment of set point, provides simultaneous operation of the master and slave accumulators, but does not interfere with the quick response, closed loop back pressure control already in process.

According to the invention, for the refill portion of the blow molding process, the accumulator head is under back pressure control, achieved by closing a pressure loop around the ram for each head. In a two accumulator system, for example, the set point for the pressure of one head is held constant while the set point pressure in the other head is continually adjusted based on the output from a position comparator between the two heads. More specifically, the relative positions of the rams in the accumulator heads are compared on the basis of percentage of full shot as indicated by respective position transducers connected with the ram. For purposes of illustration, the two accumulator heads will be identified as "A" and "B". If the position comparator indicates that head A is behind head B in refilling, the set point pressure for head B is increased, causing it to fill more slowly. Alternatively, if the comparator indicates that head A is filling faster than head B, the pressure set point on head B is decreased, causing head B to fill faster.

In essence, the process or method defined by the present invention can be defined in the context of in an extrusion blow molding machine having multiple accumulator heads that are supplied by a common extruder. Each accumulator has hydraulically operated ram that is operated to control the internal volume of the accumulator. More specifically, the invention involves a method for controlling simultaneously the rate at which the accumulators are filled with melt, comprising the steps of:

(a) establishing a reference set point for the pressure that will be applied to the ram of a master accumulator during refill, (b) establishing an initial set point for the pressure that will be applied to the ram of one or more slave accumulators during refill, (c) simultaneously admitting plastic melt into the accumulators, (d) providing closed loop control of the pressure on the ram of each accumulator according to the respective set points, (e) determining the position of the ram of each of the accumulators, (f) comparing the ram positions on the basis of percent of full shot, and (g) adjusting the pressure set points of the slave accumulators on the basis of the ram position comparison of step (f), to alter the rate at which the slave accumulators are filled so that all accumulators will receive a full shot of melt at essentially the same point in time.

A similar control method is also employed for simultaneous extrusion of the parisons by providing closed loop velocity control for the accumulator rams. In this case, while the parison is being extruded, ram positions are compared. Based on the comparison, the closed loop velocity set point of the slave accumulator(s) is increased or decreased in order to bring the slave accumulators in conformance with the master accumulator. Accordingly, the invention also provides a method for simultaneously controlling the rate at which the accumulators are operated to extrude parisons, comprising the steps of:

(a) establishing a reference set point for the velocity of the ram of a master accumulator during extrusion of the parison, (b) establishing an initial set point for the velocity of the ram of one or more slave accumulators during extrusion of the parison, (c) simultaneously operating the accumulators to extrude parisons, (d) providing closed loop control of the ram velocity in each accumulator according to the respective set points, (e) determining the position of the ram of each of the accumulators, (f) comparing the ram positions on the basis of percent of full shot, and (g) adjusting the velocity set points of the slave accumulators on the basis of the ram position comparison of step (f), to alter the rate at which the parisons are extruded by the slave accumulators so that all accumulators complete extrusion of the parisons at essentially the same point in time.

The cascade control method of the invention can also be applied to systems that have a separate extruder feeding each accumulator head. In this case the speed (rpm) set point for the extruder supplying a slave accumulator is adjusted to keep the slave head(s) in sync with the master head during refill. More specifically, the screw rpm for the extruder supplying the master head is set at a desired speed and controlled closed loop. The slave head extruder is also set at a specific speed (rpm) and controlled closed loop. The control monitors the difference in fill position between the master and slave head(s) and changes the screw speed set point for the extruder supplying the slave head to keep its filling in synchronization with the master head.

DESCRIPTION OF THE PREFERRED EMBODIMENT

Figure 1:
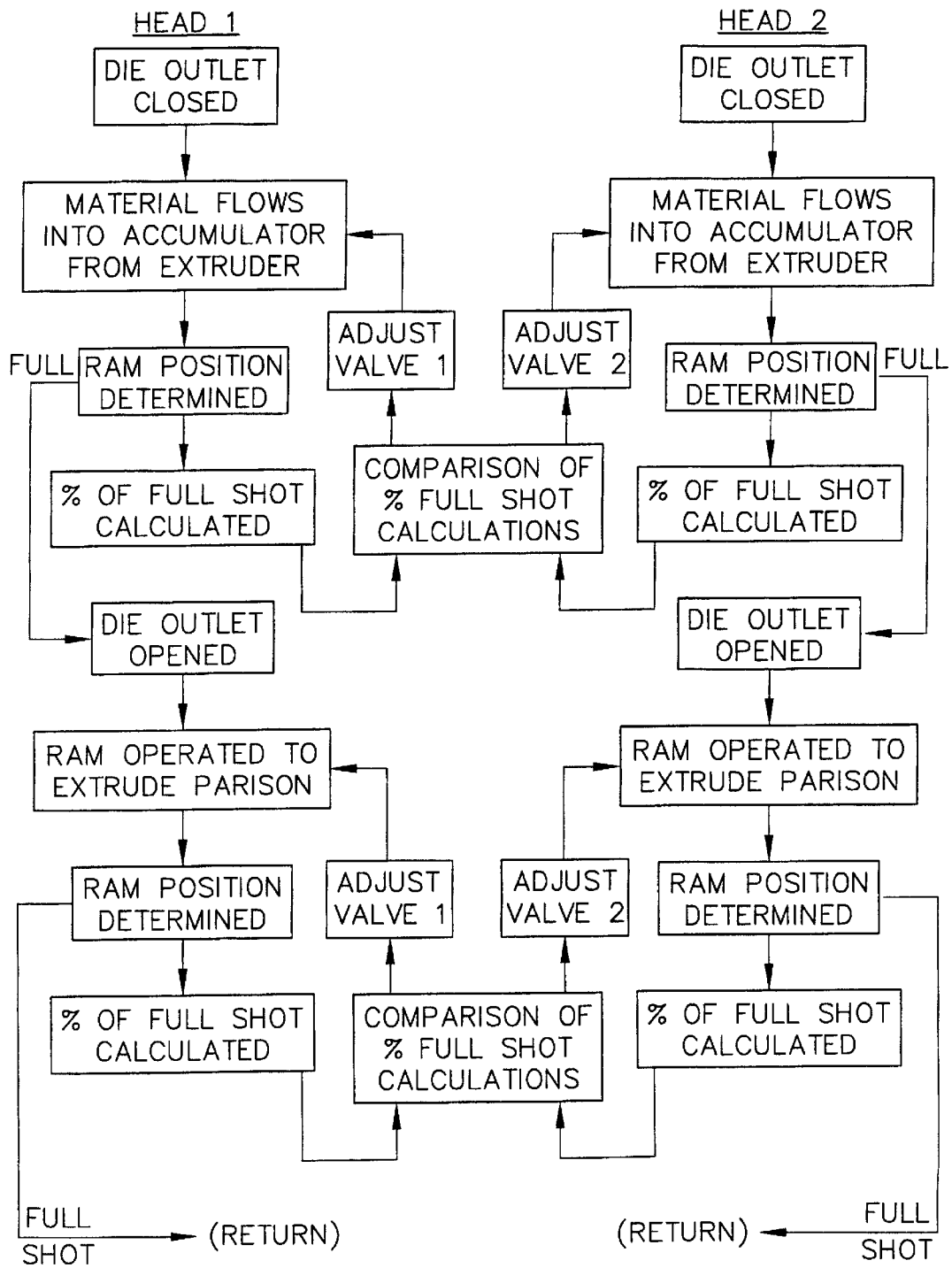
FIG. 1 is a flow diagram showing the prior art control methods for coordinating the movements of the rams in multiple accumulators.
Figure 2A:
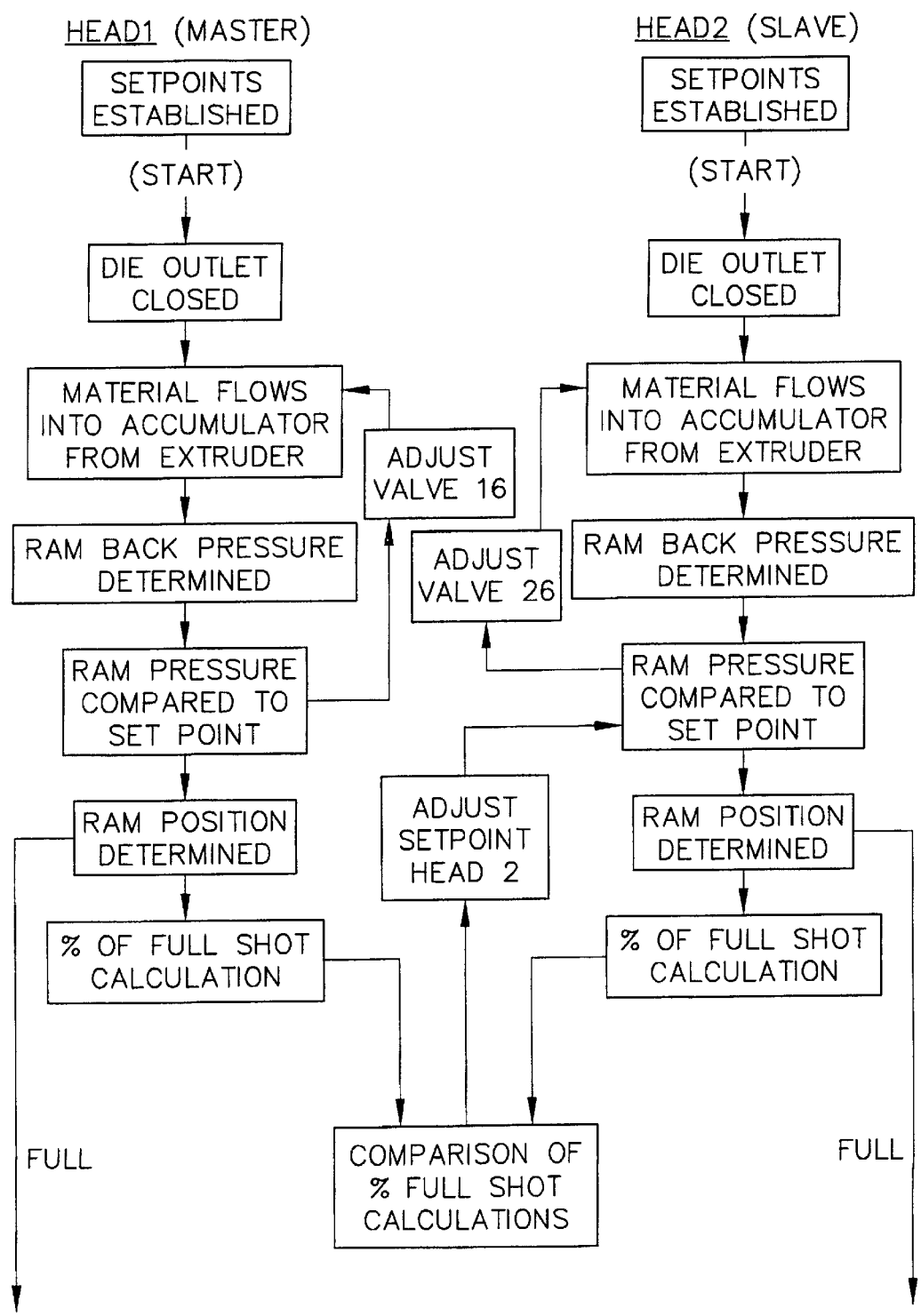
FIGS. 2A and 2B show a flow diagram of the cascade control method for multiple accumulators according to the present invention.
Figure 2B:
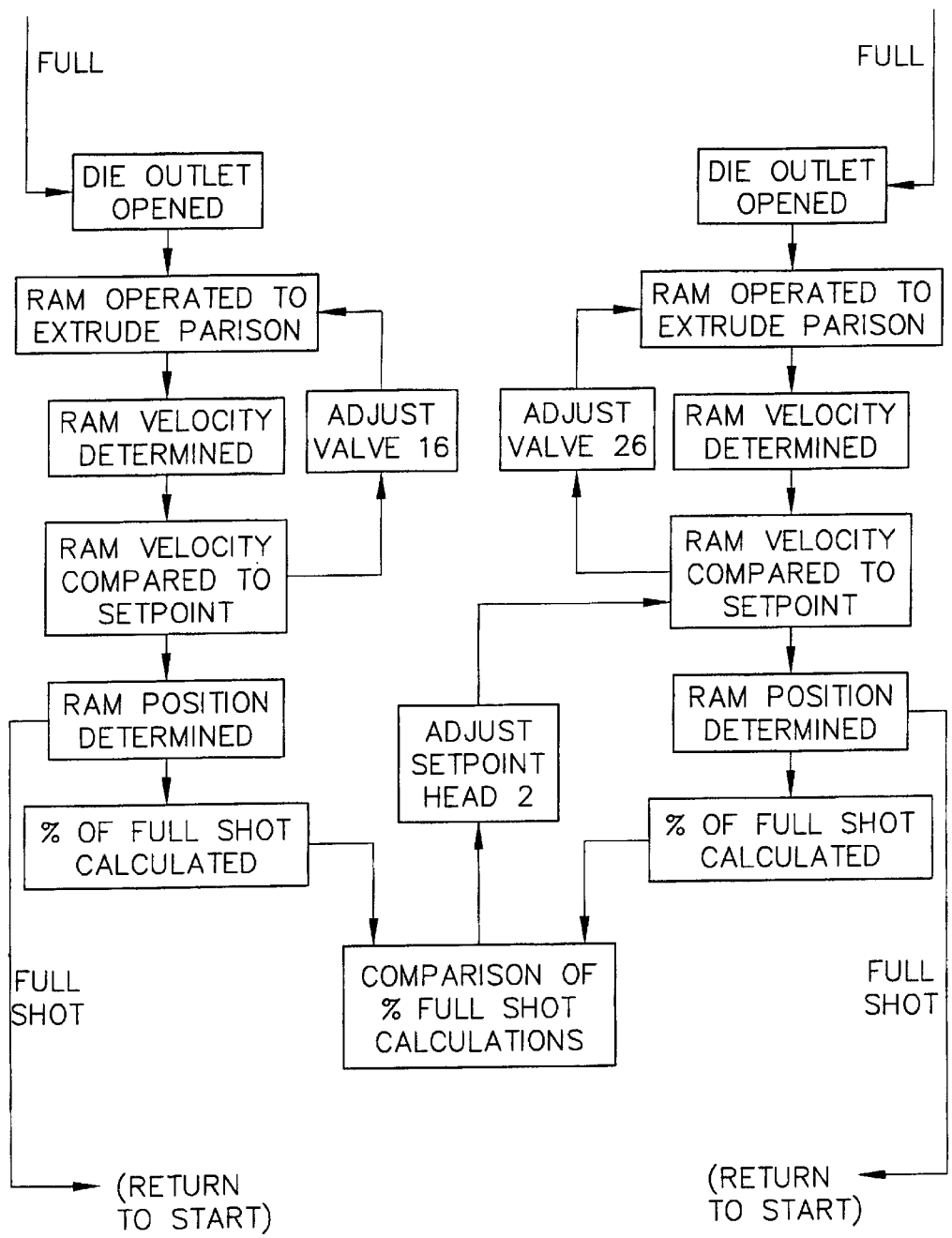
Figure 3A:
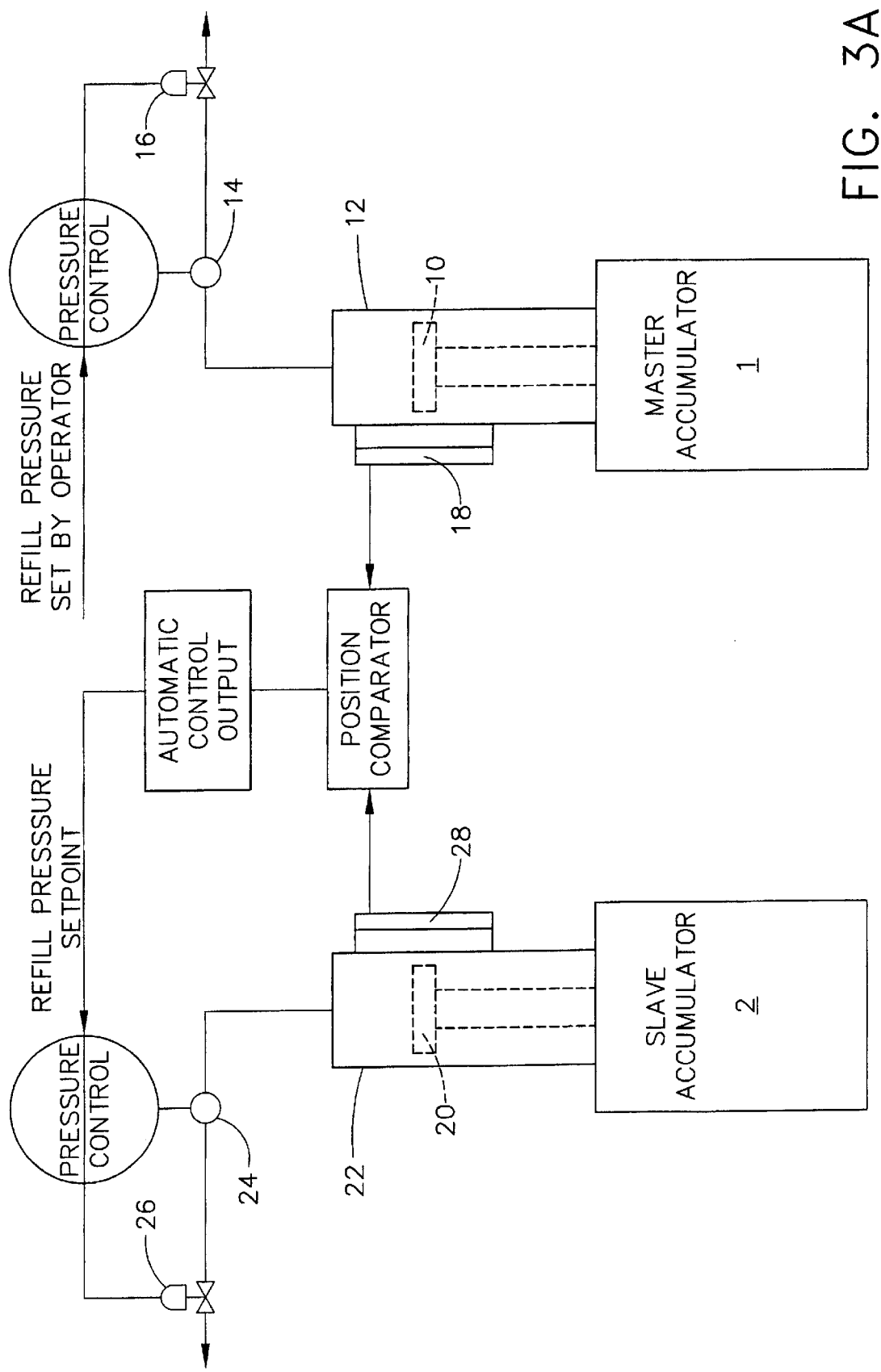
FIG. 3A is a diagrammatic representation of the accumulators and associated elements, including the machine control, that interact to accomplish the method of the present invention with respect to refilling the accumulators.
Figure 3B:
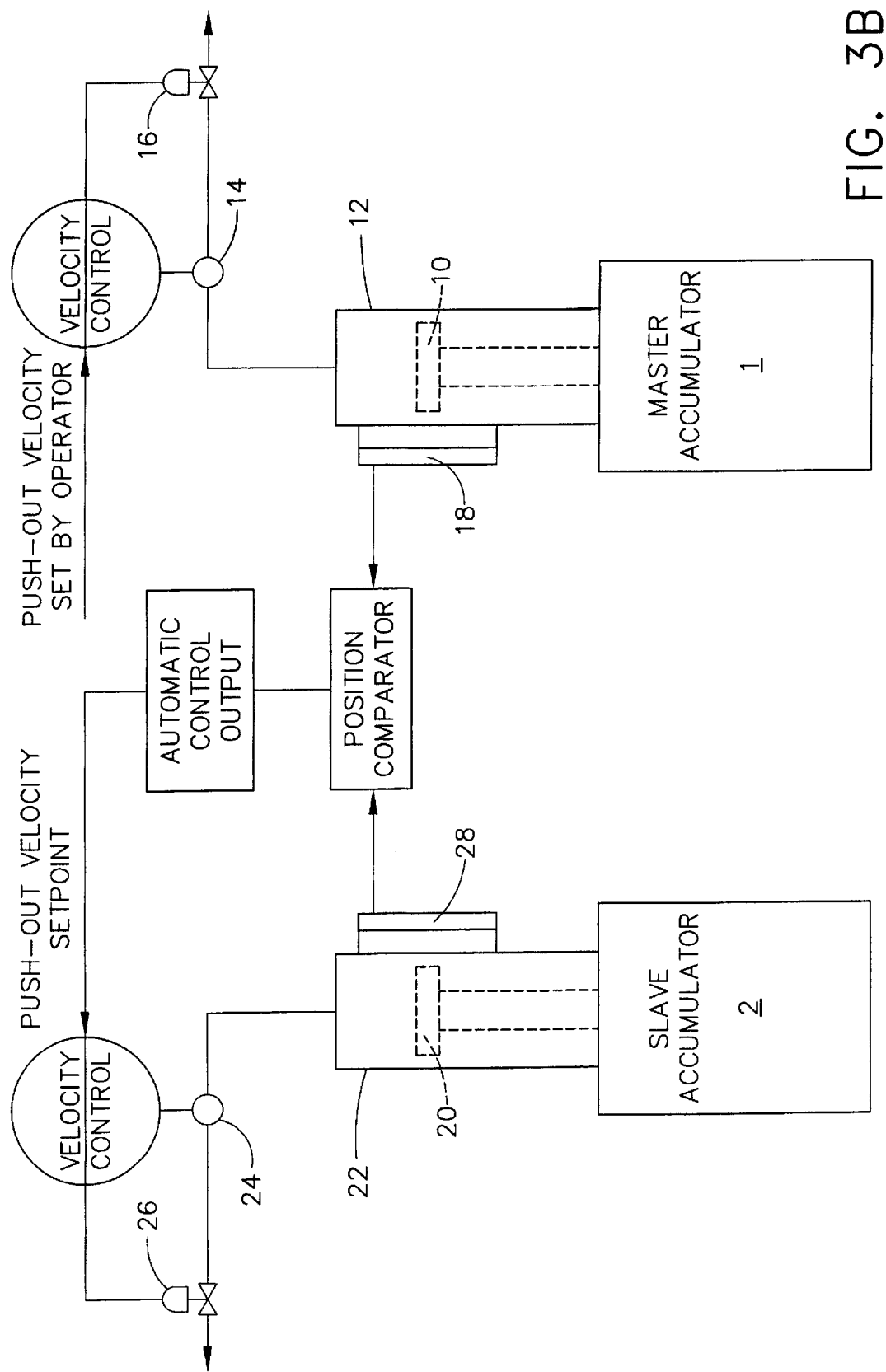
FIG. 3B is a diagrammatic representation of the accumulators and associated elements, including the machine control, that interact to accomplish the method of the present invention with respect to extrusion (push-out) of the parison from the accumulators.

Referring to FIGS. 2 and 3, the method of the present invention is used in conjunction with multiple accumulator heads for an extrusion blow molding machine, as is generally known in the art. While the present method can be used in conjunction with any number of accumulators as required for the intended used of the machine, the present discussion will be directed to a machine having two accumulators. This configuration is representative and a common embodiment for multiple head machines; the principles described with regard to two accumulators will be equally applicable to a greater number.

The present method is preferably used in conjunction with hydraulically actuated accumulators 1,2 (see FIGS. 3A and 3B), as are well-known in the art. In general, the construction of such an accumulator includes a ram 10,20 that is displaceable by a hydraulic cylinder (not shown) to vary the internal volume of the accumulator 1,2. This internal accumulator chamber serves to receive the thermoplastic material from which the parison will be formed. In addition, the accumulator includes a programming system (not shown—typically hydraulically operated) to control the size of the outlet (die) opening. The programming system is directly associated with opening the die for extrusion of the parison and closing the die to allow material to be accumulated within the internal chamber.

Since the accumulator ram 10,20 is operated by hydraulic pressure, the preferred means of controlling ram movement is to control directly the pressure of the fluid acting on the cylinder that drives the ram 10,20. During the extrusion of a parison, the pressure on the ram will determine the rate at which extrusion occurs. Likewise, during refill, a back pressure is maintained on the cylinder that drives the ram to control the processing conditions and rate for which the material is accumulated in preparation of forming the parison. Accordingly, it is desirable to control the pressure on the ram 10,20 so that both accumulators 1,2 will operate simultaneously during both the filling portion of the process and the extrusion portion of the process, and complete the respective functions at the same point in time. In addition, any adjustments to the back pressure during filling need to be made in such a way to maintain a smooth, uniform upward movement of the ram 10,20.

The preferred method of simultaneous control according the present invention involves use of one accumulator as a reference ("master") and adjusting the operation of the other ("slave") accumulator(s) to correspond. Accordingly, in the master accumulator 1, the refill pressure is preferably set by the operator during the initial set up of the machine. This pressure setting is maintained by closed loop control during refill of the accumulator chamber by adjusting a servovalve 16 (or proportional valve) associated with the ram cylinder 12. More specifically, as material flows into the accumulator chamber from the extruder, the ram 10 is moved by the material accumulating in the chamber, creating a back pressure in the associated hydraulic cylinder. This pressure is controlled by the servovalve 16 and a pressure transducer 14 which interact with a pressure control routine performed by the machine control. In other words, the control has an established pressure set point, the pressure transducer 14 reads the actual pressure in the hydraulic cylinder acting on the ram 10 and compares it with the back pressure set point. If the set point and actual pressure correspond, there is no action. When there is a difference between the measured pressure and the set point, the servovalve 16 is adjusted causing the pressure in the cylinder to increase or decrease so that it matches the predetermined set point.

There is a similar initial set point for the slave accumulator 2, either identical to the set point entered by the operator for master accumulator 1, or produced by some initialization logic as set forth in the pressure control for the system. In any event, the set point for slave accumulator 2 functions in the same way as the set point of the master accumulator 1. Control of back pressure on the ram is achieved by measuring the pressure in the associated hydraulic cylinder by means of the pressure transducer 24 and adjusting the servovalve 26 to match the measured pressure with the reference set point.

The next step (see FIG. 2) in regard to matching the operation of the accumulators is critical. The position of the ram 10,20 in each accumulator 1,2 is measured by means of an appropriate sensor, such as a linear pot or other suitable linear position transducer 18,28. Since the operator has established the full stroke of each ram 10,20 in setting up the machine (by setting the shot size), the position provided by the transducer 18,28 is easily converted to a percentage of the full shot for each of the accumulators. These percentages are then compared to determine whether the filling of the two accumulators 1,2 is proportionate. In other words, the accumulators 1,2 must be controlled to reach the same percentage of fill at the same point throughout the filling stroke. If a discrepancy between the percentage of refill is identified, the back pressure set point in the slave accumulator 2 is adjusted so that the rate of movement of the ram 20 will altered to bring it to a position that provides the same shot percentage as detected in the master accumulator 1.

For example, if the slave accumulator 2 is filling faster than the master accumulator 1, the back pressure set point for the slave accumulator 2 will be increased to slow the rate at which the slave accumulator 2 fills. Alternatively, if the slave accumulator 2 is filling slower than the master accumulator 1, the pressure set point of the slave accumulator 2 will be decreased so that it will immediately begin filling faster.

It is important to realize that while the calculations made by the control with respect to the ram positions are occurring relatively rapidly, they do not happen as fast as the closed loop corrections to the back pressure. By way of reference, the full stroke for the filling of an accumulator is usually just a matter of seconds. In any event, it has been found that by separating the control functions that affect movement of the ram, the control operation is more efficient. In particular, the closed loop pressure control is continually referring to a fixed set point, while the comparison calculations are done separately to adjust that set point, as required.

Figure 4A:
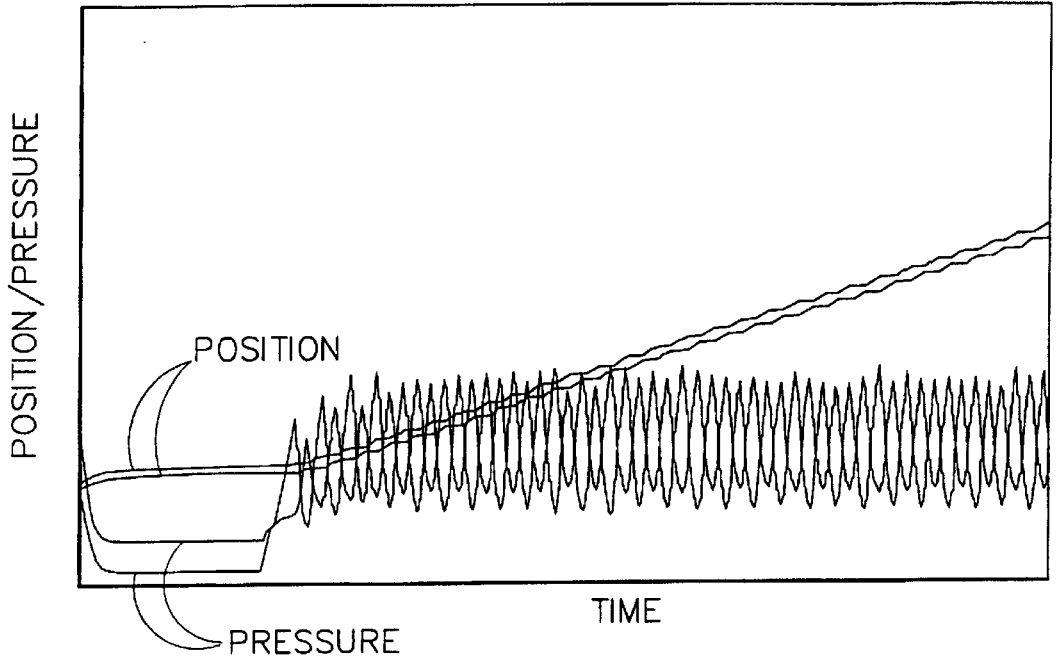
FIG. 4A is a chart showing the position of the accumulator ram with respect to time for two accumulators, along with the action of the associated servovalves, for an accumulator system of prior art. (Note that the plots are offset along the "Y-axis" a constant amount to facilitate differentiation between the data for the two systems.)

Concerning movement of the ram during refill, FIG. 4A illustrates the "stair steps" in position changes for the rams of two accumulators in a prior art system. (Note that the plots are offset along the "Y-axis" a constant amount to facilitate differentiation between the data for the two systems.) The movement of the rams occurs in steps as shown because of the relatively large lag in changes in the associated servovalve. These recurring changes in relative position are detrimental to the extrusion and blow molding process. Note also the corresponding fluctuations in back pressure of the hydraulic cylinder acting on the ram, shown overlaid on the graph of ram position.

Figure 4B:
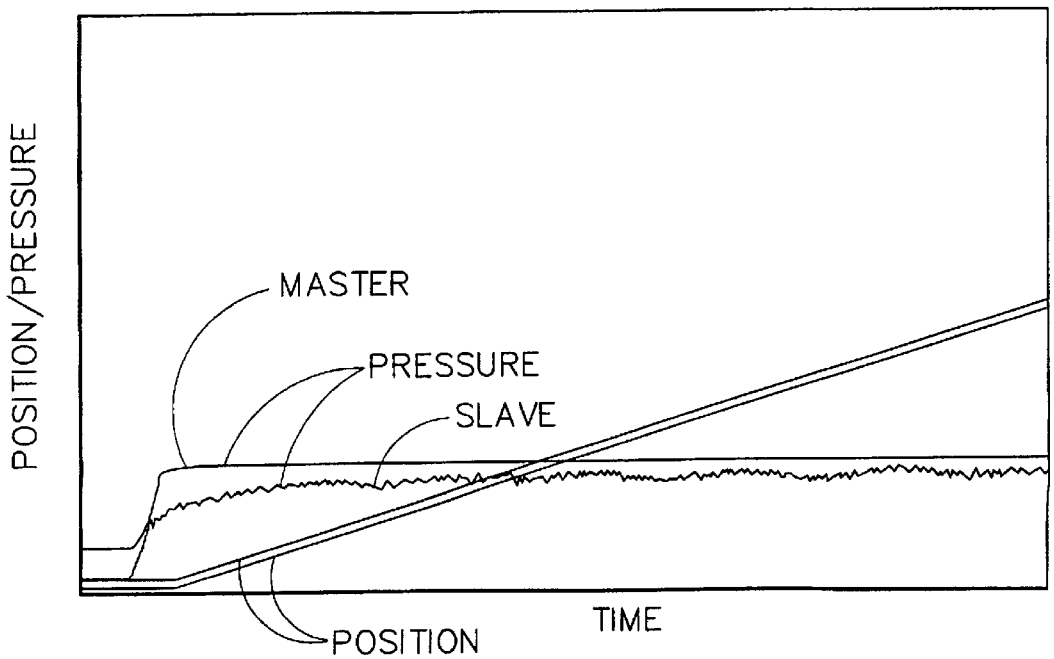
FIG. 4B is similar to FIG. 4A except that it shows the filling of accumulators and the valves' action according to the method of the present invention. (Note that the plots are offset along the "Y-axis" for clarity.)

On the other hand, FIG. 4B shows a much smoother, more uniform line representing the movement of the rams as the two accumulators are filled over the same interval. When the plotting offset is removed, the position of the two rams if virtually identical over the entire refill stroke. Similarly, the variation in back pressure is much less severe as reflected by the shorter interval and more uniform reading throughout the process. As described previously, the back pressure for head 1 is shown as a constant set point, while the set point for head 2 is continually reset (a relatively small amount) as required to synchronize the heads. This method effectively produces movement of the rams that is likewise more uniform, enabling more precise control of the refill process.

The principles for controlling ejection (push-out) of the parison in a uniform manner are very similar. In this case, however, a velocity set point (rather than a pressure set point) is used as the basis for the primary closed loop control. The push-out velocity is set by the operator as an initial condition for operation of the blow molding process. As hydraulic pressure is applied to operate the actuating cylinder and extrude the parison, feedback on the position of the accumulator ram 10,20 as provided by the associated transducer 18,28 is used to calculate a corresponding velocity. This "actual" velocity is compared against the velocity set point and the servovalve 16,26 adjusted to increase or decrease the pressure applied to the ram 10,20, thereby matching the actual velocity with the preset velocity.

As closed loop velocity control is implemented on the continuing basis, the percent of shot extruded is compared between the two accumulators 1,2. As before with filling the accumulators, the overall or full shot of the accumulator is known (preset) so that the position of the accumulator provides a basis for calculating the percentage of the shot that has been extruded. The percentages are compared; if there is a discrepancy, the velocity set point of the slave accumulator 2 is adjusted to bring its position into agreement with the master accumulator 1. For example, if the ram 20 of the slave accumulator 2 is ahead the ram 10 of the master accumulator 1, the velocity set point of the slave accumulator 2 is decreased, thus slowing the movement of the ram 20 and bringing the two accumulators into proportionate positions. Alternatively, if the slave accumulator 2 has extruded a smaller percentage of its parison than the respective parison of the master accumulator 1, the velocity set point of the slave accumulator 2 is increased in order to speed up the extrusion so that both parisons will be fully formed at essentially the same point in time.

Figure 5A:
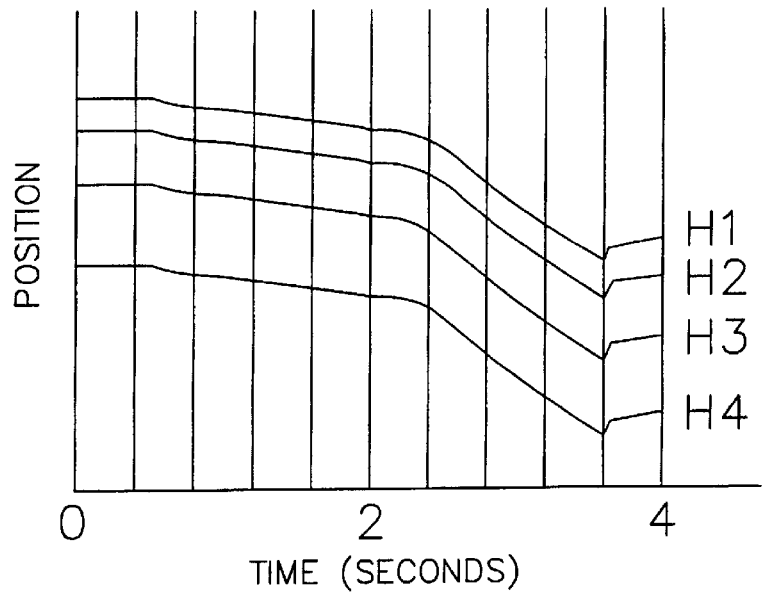
FIG. 5A shows the ram position for four accumulators during extrusion of their respective parisons, according to the method of the present invention. (Note that the plots are offset along the "Y-axis" for clarity.)
Figure 5B:
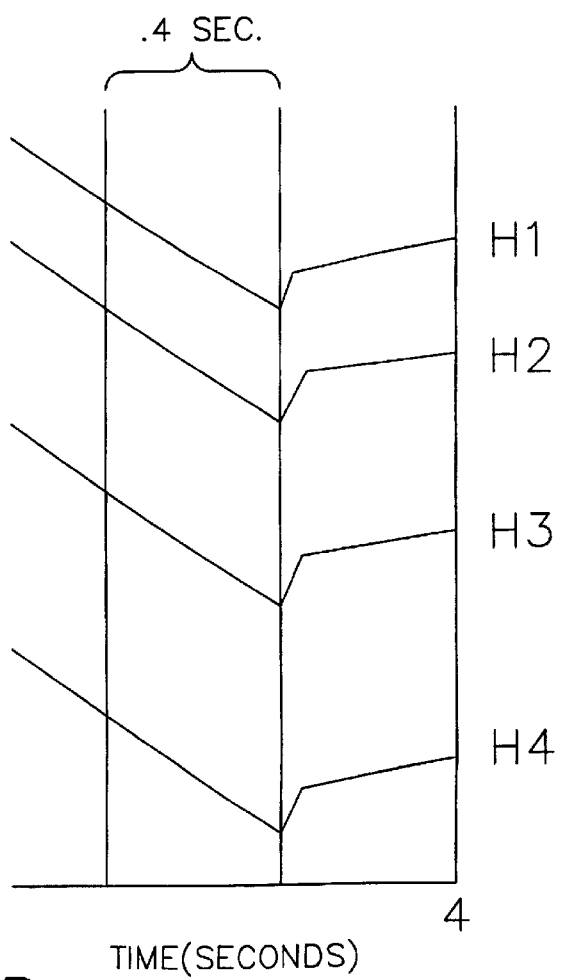
FIG. 5B is another (enlarged) graph of the ram position plots shown in FIG. 5A, focusing on the segments where the extrusion is complete to show more clearly the simultaneous completion of the extrusion stroke according to the method of the present invention. (Note that the plots are offset along the "Y-axis" for clarity.)

The advantage of cascade velocity control during push-out is further illustrated by the ram position plots shown in FIGS. 5A and 5B. More specifically, the plots shown in FIG. 5A show the positions for four accumulator heads controlled by the closed loop cascade control method of the present invention. Here again, the plots have been offset along the "Y-axis" a constant amount to facilitate differentiation of the data for the four heads. The prominent aspect of this graph is that all four rams complete extrusion of their parison at virtually the identical point in time. This uniformity is further illustrated by the plot segments shown in FIG. 5B, where a four tenths (0.4) of a second interval is marked for reference. By contrast, the points of completion for parison extrusion in a four head system controlled by prior art methods would have a range of about three tenths (0.3) of a second.

Referring again to FIGS. 2A and 2B, a complete cycle of operation for an extrusion blow molding machine having multiple accumulators will now be described. Beginning at the point where the die outlet is closed, material begins flowing into the respective accumulator chambers from the extruder. As the material enters each accumulator chamber, it applies a force to the ram 10, 20 of the accumulator 1,2, creating a back pressure. An internal (closed) loop in the control sequence maintains the ram back pressure at a predetermined set point based on input from the pressure transducer 14,24 and actuation of the associated servovalve 16,26. As the accumulators 1,2 continue to fill, the ram position in each accumulator is determined by the transducer 18,28 and a percentage of full shot calculation is made. The percentage full shot calculation for each accumulator 1,2 is compared to determine the relative position of the rams 10,20. If the calculated percentages are not equal, the set point for the slave accumulator 2 is adjusted closed loop to bring the ram positions into agreement. The calculations for comparison of the percentage full shot continue throughout the filling period for the accumulator with appropriate closed loop adjustments being made as required. Concurrently, the closed loop control of the back pressure on the accumulator continues to operate using the set point as predetermined for the master accumulator and the adjusted set points as necessary for the slave accumulator(s) 2.

When a full charge of material has been received by the accumulators 1,2, the die outlet is opened and extrusion of the parison is initiated for the accumulators in the molding system. As each parison is extruded, the position of the ram 10,20 is monitored and a velocity calculation made. A closed loop control sequence compares the calculated velocity with the set point velocity for each accumulator 1,2 and actuates associated servovalves 16,26 to modify the speed of the ram 10,20 so that it conforms to the set point. In addition, the ram position from transducer 18,28 is used for another closed loop control sequence to calculate the percentage of full shot and compare it to the positions of the other accumulators. If the percentage of full shots of the accumulators differ, the velocity of the slave accumulator 2 is adjusted closed loop to match its ram position to that of the master accumulator 1. The control continues to make comparisons of the percentage completion of extrusion of the parison so that it can maintain equality by adjusting (closed loop) the velocity set point of the slave accumulator 2. Concurrently with this, the closed loop control of velocity continues using the predetermined set point for the master accumulator 1 and the adjusted set points as determined by the shot comparison.

Upon completion of the extrusion stroke of the respective accumulators, the parisons are fully formed, the die outlet closes and the mold closes around both parisons, initiating the process of blowing the parisons to conform to the mold cavity. Concurrent with the actual blow molding operation, the extruder begins to feed material into the accumulators 1,2 beginning another cycle of operation as just described. This mode of operation clarifies the need for simultaneous completion of the ejection of the parison so that the mold can close on both parisons just as soon as they are ready for forming. This sequence minimizes any variations between the parisons and also helps to minimize the overall cycle time for the blow molding process.

Figure 6:
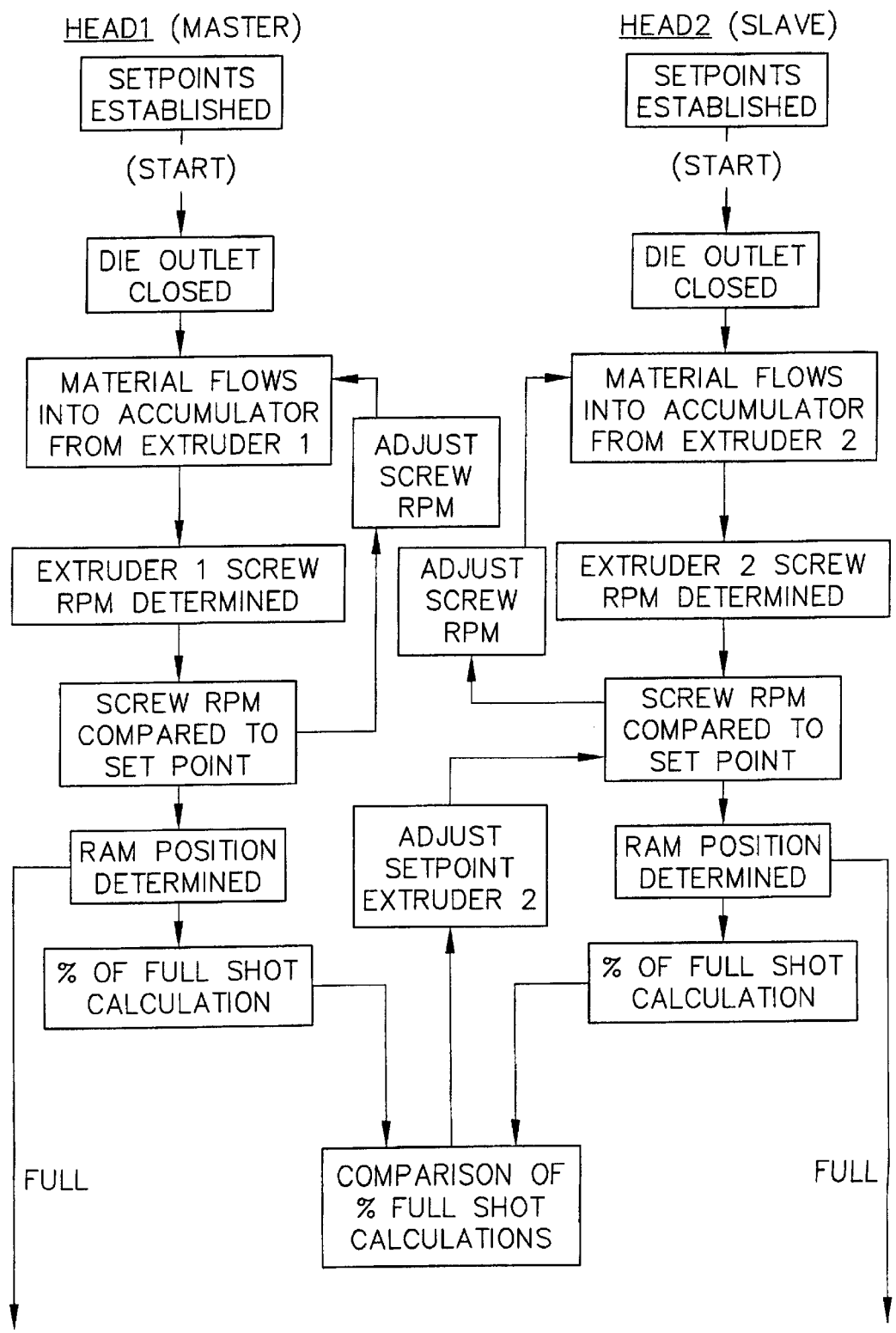
FIG. 6 is a flow diagram similar to FIG. 2A except that it shows the control method of the present invention for refilling the accumulators when they are supplied by separate extruders.

The cascade control method of the invention can also be applied to systems that have a separate extruder feeding each accumulator head 1,2. For these multiple extruder systems, the speed (rpm) set point for screw rotation of the extruder supplying the slave accumulator 2 is adjusted to keep it in sync with the master accumulator 1 during refill, see FIG. 6. More specifically, the rotational speed for the screw of the extruder supplying the master accumulator 1 is preset by the operator and controlled closed loop. The rotation of the screw in the extruder supplying the slave accumulator 2 is also set at a specific speed and controlled closed loop. During refill (using feedback from the position transducers 18,28), the control monitors the difference in fill position between the rams 10,20 of the accumulators 1,2 and changes the speed set point of the extruder supplying the slave accumulator 2 to keep it in sync with the master accumulator 1. For example, if the slave accumulator 2 is filling more slowly, the screw speed set point of the associated extruder is increased so that the slave accumulator 2 fills faster; if the slave accumulator 2 is ahead of the master accumulator 1 its screw speed set point is decreased. The set point adjustment continues as required until refill is complete. The subsequent extrusion of the parisons is subject to velocity control, as described previously for single extruder systems, see FIG. 2B.

The method of the present invention thus provides for effective control of the filling and parison extrusion for multiple accumulators in an extrusion blow molding machine. Although particular embodiments of the present invention have been illustrated and described, it will be apparent to those skilled in the art that various changes and modifications can be made without departing from the spirit of the present invention. For example, the number of accumulators and extruders can be varied as required for a particular application. Alternatively, while the accumulator ha been described as being hydraulically operated, the principles of the present invention would be equally applicable to electro-mechanically driven accumulators. It is therefore intended to encompass within the appended claims all such changes and modifications that fall within the scope of the present invention.

What we claim is:

1. In an extrusion blow molding machine having a master accumulator and a slave accumulator supplied by at least one extruder, each accumulator having a ram that is moveable to change an internal volume of the accumulator, a method for controlling simultaneously the rate at which the volume of each accumulator changes, comprising the steps of:

a) selecting an operating parameter that relates to movement of the ram in each accumulator,
 b) establishing a reference set point for the operating parameter of the master accumulator,
 c) establishing an initial set point for the operating parameter of the slave accumulator,
 d) initiating simultaneous movement of the ram in each accumulator,
 e) providing closed loop control of the operating parameter for each accumulator according to the respective set point,
 f) determining the position of the ram of each accumulator,
 g) comparing the position of the rams as a percentage of the full stroke of each accumulator, and
 h) adjusting the set point of the slave accumulator on the basis of the position comparison of step (g) to alter the rate of movement of the ram in the slave accumulator so that the rams of the accumulators will reach a full stroke at essentially the same point in time.

2. The method as set forth in claim 1 wherein the operating parameter is pressure applied to the ram during refill.

3. The method as set forth in claim 1 wherein the operating parameter is velocity of the ram during extrusion of a parison.

4. The method as set forth in claim 1 wherein the accumulators are supplied by separate extruders, each extruder having a feed screw operating at a given rotational speed to supply melt to the associated accumulator, and the operating parameter is rotational speed of the extruder feed screw.

5. In an extrusion blow molding machine having a master accumulator and a slave accumulator supplied by a common extruder, each accumulator using pressure to control movement of a ram that is used to change an internal volume of the accumulator, a method for controlling simultaneously the rate at which the accumulators are filled with melt, comprising the steps of:

(a) establishing a reference set point for the pressure that will be applied to the ram of the master accumulator during refill,
 (b) establishing an initial set point for the pressure that will be applied to the ram of the slave accumulator during refill,
 (c) simultaneously admitting plastic melt into the internal volume of the accumulators thereby moving the rams,
 (d) providing closed loop control of the pressure applied to the ram of each accumulator according to the respective set points,
 (e) determining the position of the ram of each of the accumulators,
 (f) comparing the ram positions on the basis of percent of full shot, and
 (g) adjusting the pressure set point of the slave accumulator on the basis of the ram position comparison of step (f), to alter the rate at which the slave accumulator is filled so that the accumulators will receive a full shot of melt at essentially the same point in time.

6. The method as set forth in claim 5 wherein the ram of each accumulator moves at a programmed velocity to extrude parisons, comprising the additional steps of:

(h) establishing a reference set point for the velocity of the ram of the master accumulator during extrusion of the parison,
 (i) establishing an initial set point for the velocity of the ram of the slave accumulator during extrusion of the parison,
 (j) simultaneously moving the rams of the accumulators to extrude parisons,
 (k) providing closed loop control of the ram velocity in each accumulator according to the respective set points, (l) determining the position of the ram of each of the accumulators, (m) comparing the ram positions on the basis of percent of full shot, and (n) adjusting the velocity set point of the slave accumulator on the basis of the ram position comparison of step (m), to alter the rate at which the parison is extruded by the slave accumulator so that the accumulators complete extrusion of the respective parisons at essentially the same point in time.

7. In an extrusion blow molding machine having a master accumulator and a slave accumulator supplied by a common extruder, each accumulator having a ram that moves at a programmed velocity to change an internal volume of the accumulator, a method for simultaneously controlling the rate at which the rams of the accumulators are moved to extrude parisons, comprising the steps of:

(a) establishing a reference set point for the velocity of the ram of the master accumulator during extrusion of the parison, (b) establishing an initial set point for the velocity of the ram of the slave accumulator during extrusion of the parison, (c) simultaneously moving the rams of the accumulators to extrude parisons, (d) providing closed loop control of the ram velocity in each accumulator according to the respective set points, (e) determining the position of the ram of each of the accumulators, (f) comparing the ram positions on the basis of percent of full shot, and (g) adjusting the velocity set point of the slave accumulator on the basis of the ram position comparison of step (f), to alter the rate at which the parison is extruded by the slave accumulator so that the accumulators complete extrusion of the respective parisons at essentially the same point in time.

8. In an extrusion blow molding machine having a master accumulator and a slave accumulator supplied by separate extruders, each extruder having a feed screw operating at a given rotational speed to supply melt to the associated accumulator and thereby affect the movement of a ram to change an internal volume of the accumulator, a method for controlling simultaneously the rate at which the accumulators are filled with melt, comprising the steps of:

(a) establishing a reference set point for the rotational speed of the screw of the extruder that supplies melt to the master accumulator during refill, (b) establishing an initial set point for the rotational speed of the screw of the extruder that supplies melt to the slave accumulator during refill, (c) simultaneously admitting plastic melt into the internal volume of the accumulators thereby moving the rams, (d) providing closed loop control of the rotational speed of the screw in each of the extruders according to the respective set points, (e) determining the position of the ram of each of the accumulators, (f) comparing the ram positions on the basis of percent of full shot, and (g) adjusting the rotational speed of the screw of the extruder that supplies melt to the slave accumulator on the basis of the ram position comparison of step (f), to alter the rate at which the slave accumulator is filled so that the accumulators will receive a full shot of melt at essentially the same point in time.

9. The method as set forth in claim 8 wherein the ram of each accumulator moves at a programmed velocity to extrude parisons, comprising the additional steps of:

(h) establishing a reference set point for the velocity of the ram of the master accumulator during extrusion of the parison, (i) establishing an initial set point for the velocity of the ram of the slave accumulator during extrusion of the parison, (j) simultaneously moving the rams of the accumulators to extrude parisons, (k) providing closed loop control of the ram velocity in each accumulator according to the respective set points, (l) determining the position of the ram of each of the accumulators, (m) comparing the ram positions on the basis of percent of full shot, and (n) adjusting the velocity set point of the slave accumulator on the basis of the ram position comparison of step (m), to alter the rate at which the parison is extruded by the slave accumulator so that the accumulators complete extrusion of the respective parisons at essentially the same point in time.

* * * * *